No. 853,967. PATENTED MAY 21, 1907.
H. G. GINACA.
MACHINE FOR CUTTING SUGAR CANE.
APPLICATION FILED APR. 1, 1905.

Witnesses:

Inventor:
H. G. Ginaca
By Pennie & Goldsborough
Attys.

No. 853,967. PATENTED MAY 21, 1907.
H. G. GINACA.
MACHINE FOR CUTTING SUGAR CANE.
APPLICATION FILED APR. 1, 1905.

Witnesses:
Inventor:

No. 853,967. PATENTED MAY 21, 1907.
H. G. GINACA.
MACHINE FOR CUTTING SUGAR CANE.
APPLICATION FILED APR. 1, 1905.

Witnesses:
Inventor:

No. 853,967. PATENTED MAY 21, 1907.
H. G. GINACA.
MACHINE FOR CUTTING SUGAR CANE.
APPLICATION FILED APR. 1, 1905.

Witnesses:
O. W. Edelin.
R. Laut.

Inventor:
H. G. Ginaca.
By Pennie & Goldsborough
Attys.

No. 853,967. PATENTED MAY 21, 1907.
H. G. GINACA.
MACHINE FOR CUTTING SUGAR CANE.
APPLICATION FILED APR. 1, 1905.

Witnesses:

Inventor.
H. G. Ginaca
By Pennie & Goldsborough
Attys.

UNITED STATES PATENT OFFICE.

HENRY GABRIEL GINACA, OF HONOLULU, TERRITORY OF HAWAII, ASSIGNOR, BY DIRECT AND MESNE ASSIGNMENTS, OF TWO-FIFTHS TO ABRAHAM GARTENBERG, OF HONOLULU, TERRITORY OF HAWAII.

MACHINE FOR CUTTING SUGAR-CANE.

No. 853,967.     Specification of Letters Patent.     Patented May 21, 1907.

Application filed April 1, 1905. Serial No. 253,311.

*To all whom it may concern:*

Be it known that I, HENRY GABRIEL GINACA, a citizen of the United States, residing in Honolulu, Island of Oahu, Territory of Hawaii, have invented new and useful Improvements in Machines for Cutting Sugar-Cane, of which the following is a specification.

The invention relates to the cutting apparatus of machines for harvesting cane, corn, and the like, and has for its object a cutting apparatus comprising a reciprocating knife having a spring actuated cutting stroke, and where the knife is positively retracted and the spring simultaneously compressed for the next stroke; also to provide a spring actuated knife which is held normally out of action and which is thrown into action by a trip which is operated by the standing cane; also to provide a cutting apparatus having a reciprocating knife operated in the above described manner, where the knife is adapted to be released, so that the spring will actuate it, either by hand or by contact of the cane with the trip as above described.

With the above and other objects in view, my invention consists in the novel arrangement and construction of parts, as will be hereinafter fully described and claimed, reference being had to the accompanying drawings, in which corresponding parts in the several figures are designated by like characters of reference.

Figure 1:
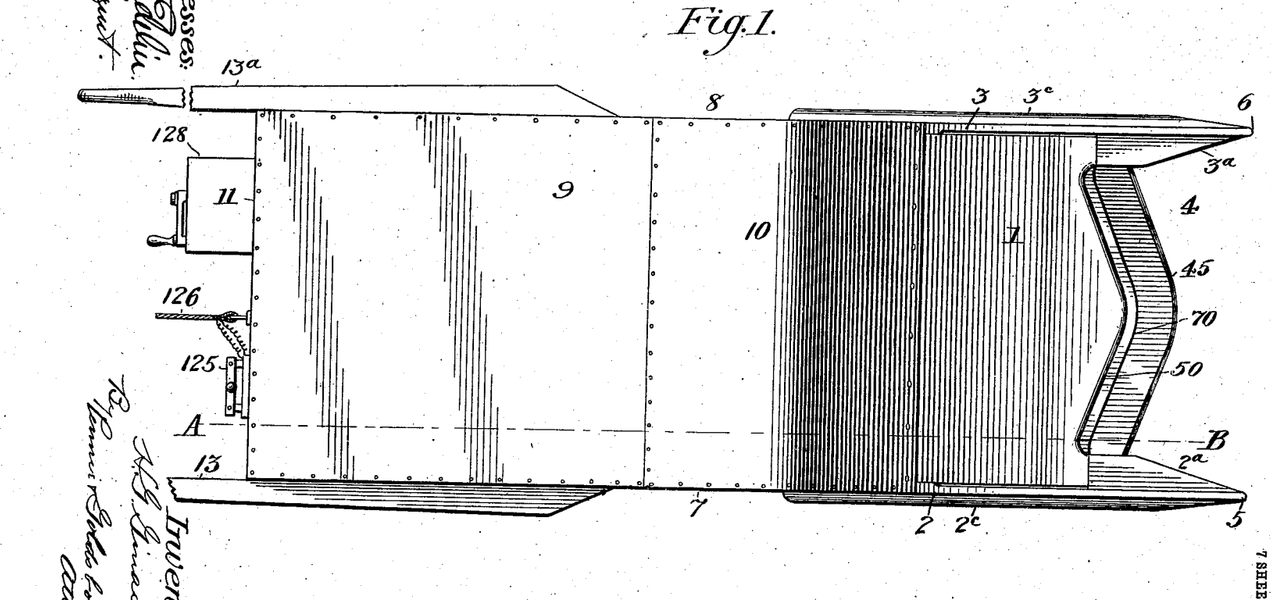
Figure 1 represents a top plan view of a machine embodying my invention.

Referring to the drawings, the front of the machine is composed of the steel casting 1, bolted between the side-castings 2 and 3, whose forward ends terminate in the prongs 5 and 6 respectively. Inside of the side-castings 2 3 are the projections $2^a$ $3^a$, against which the casting 1 abuts, and which taper inwardly and rearwardly starting from the prongs 5 6 respectively, on each side of the crotch 4, as best shown in Fig. 1. In the side-castings 2 3, forward of their junction with the casting 1, and above the projections $2^a$ $3^a$ and rearward of the prongs 5 6, are the openings $2^b$ $3^b$ respectively, which form exits through which any accumulated soil in the crotch 4 passes out. The lower edges of the side-castings 2 and 3 are widened to form a support for the machine consisting of the shoes $2^c$ and $3^c$. The plates 7 and 8, fastened to the side-castings 2 and 3 respectively, complete the sides of the machine. The top edges of the plates 7 and 8 are rigidly connected by the cover-plate 9. The cover-plate 10 and the end-plate 11 are preferably made removable, for access to the interior of the casing of the machine. The plate 12, bolted to the rear portions of the side-castings 2 and 3 and of the plates 7 and 8 respectively, forms a support upon which is secured the motor 14, which furnishes the power for both the propelling and the cutting mechanisms hereinafter described. Handles 13 $13^a$ are attached to the sides 7 8 respectively for guiding the machine.

The head 15 of the motor 14 not only supplies a bearing for the armature-shaft 16 but forms the boxes 19 and 20 in conjunction with the cap 17. The shaft 18, journaled in the boxes 19 and 20 transversely of the center line of the machine, is suitably geared to the armature-shaft 16, so as to run at a reduced speed, by means of the spiral-gear 23 on the shaft 18 meshing with the spiral-pinion 24 keyed to the armature-shaft 16. Both the head 15 and the cap 17 are enlarged between the boxes 19 and 20 so as to form a casing to exclude dirt and to permit of the gearing being run in a lubricant. On the shaft 18, just outside of the boxes 19 20, are provided the cranks 21 22 in line with each other. A round pin 25 is supported by, and extends through, the bosses 26 26 cast on the lower end of the cap 17. The rocker-arms 27 28 are mounted to swing on this pin 25 just outside of the bosses 26 26, and the pitmen 29 30 connect the cranks 21 22 with the pins 31 32 of the rocker-arms 27 28 respectively. The lever 35 is fulcrumed on the pin 25 between the bosses 26 26. A camshaft 33 is journaled in the bosses 37 38 at the lower ends of the rocker-arms 27 28 respectively. Pivoted on the pin 36 in the rocker-arm 27 is the lever 39 provided with a roller 41 at its lower end. A spring 40 attached to the lever 39 and to the rocker-arm 27 causes the roller 41 to press against the cam 34 on the cam-shaft 33.

Figure 3:
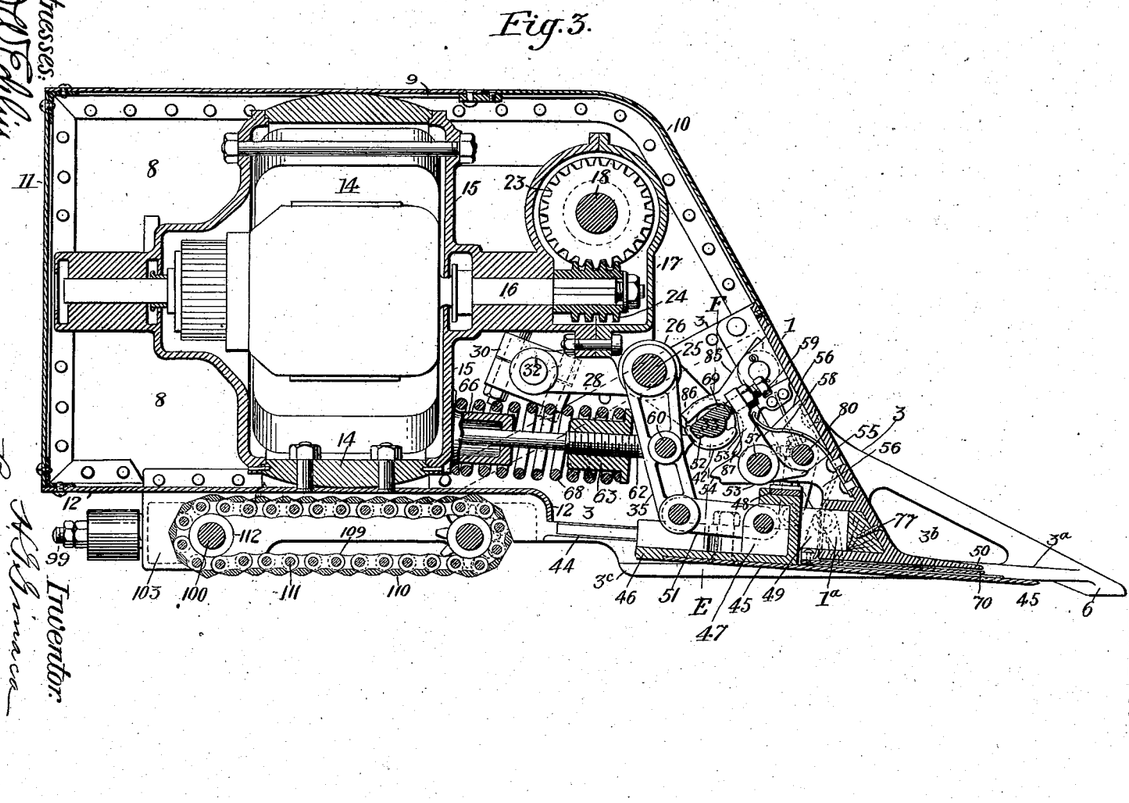
Fig. 3 is a vertical longitudinal sectional elevation through the center of the machine, showing the cutting knife in its forward position.

The block 46 is adapted to slide on the guides 43 44 projecting inwardly from the side-castings 2 and 3 respectively. The rear portion of the cutting-knife 45 is shouldered against, and is bolted to, the underside of the block 46. The guides 43 44 are slightly inclined so that the block 46 and its attached knife 45 travel slightly downward in moving forward. Near the bottom of the rear of the casting 1, a pocket 1$^a$ is formed to receive a bumper. A rubber bumper 49 backed by a wooden block 77 is shown in Fig. 3. The forward travel of the block 46 is limited by striking against the rubber bumper 49, and its impact is taken up thereby. When in its forward position the cutting-edge of the knife 45 projects into the crotch 4 some distance beyond the lip 50 or forward edge of the casting 1, as shown in Figs. 1 and 3. The knife 45 is made wider than the block 46, and its forward part moves directly underneath the trip-plate 70. The corners of the cutting-edge of said knife 45 are always under and covered by the projections 2$^a$ and 3$^a$, in order that the knife may cut any cane in its path within the full width of the crotch 4. Links 51 51 with suitable pins connect the lower end of the lever 35 with the rib 47 of the forward end of the block 46. Pivoted on each side of the lever 35 on the pin 60 through the said lever, are the eye-bolts 61 62, on which are screwed the collars 63 64 respectively, provided with flanges. Near the bottom of the head 15 on each side of the center line of the machine are the bosses 65 and 66, made hollow and having holes in their front centers through which the rear ends of the eye-bolts 61 62 are loosely guided. Over these bosses 65 66 and interposed between the head 15 and the flanges of the collars 63 64 are the springs 67 68 respectively. The tension of the springs 67 68 may be adjusted by turning the collars 63 64 on the eye-bolts 61 62 respectively.

The catch-piece 53 is pivoted to turn on the pin 57 between the lugs 56 56 projecting rearwardly from the casting 1. The toe 54 of the catch-block 53 is shaped to engage the steel plate 48 attached to the top of the sliding-block 46 when the latter is in its rear position. The spring 58 pushing against the latch 53 tends to force the toe 54 downward, the downward travel of said toe 54 is limited, however, by the stop 55 of the catch-piece 53 striking the underside of the shaft 80.

Figure 4:
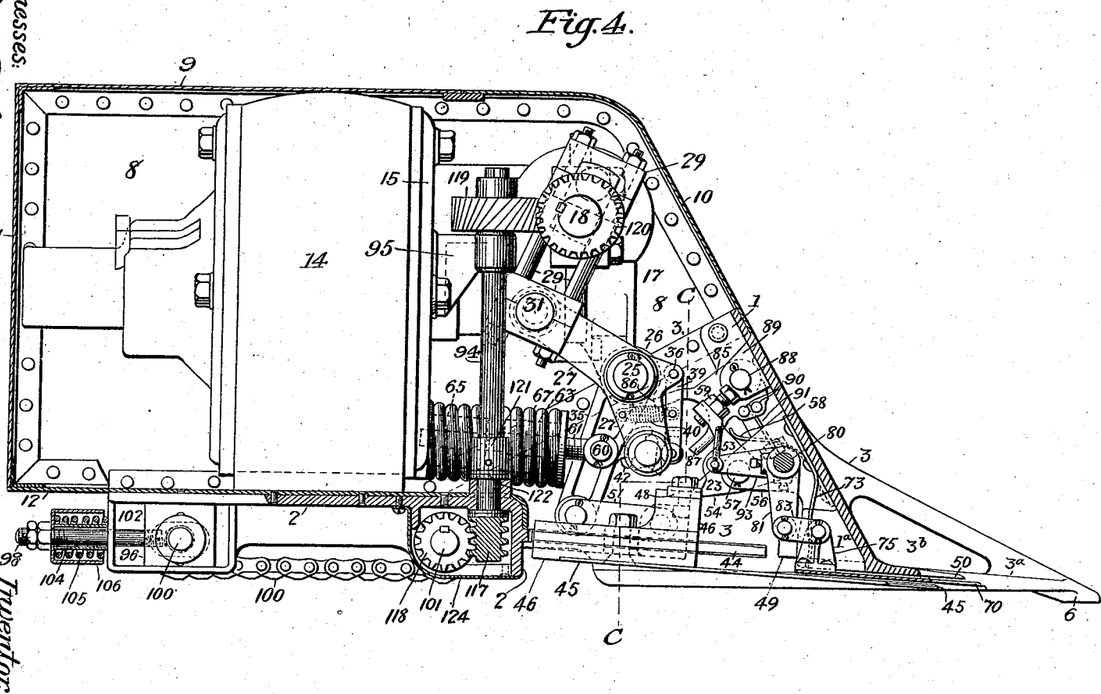
Fig. 4 is a vertical sectional elevation, on line A—B in Figs. 1 and 6, showing the cutting knife in its rear position.
Figure 5:
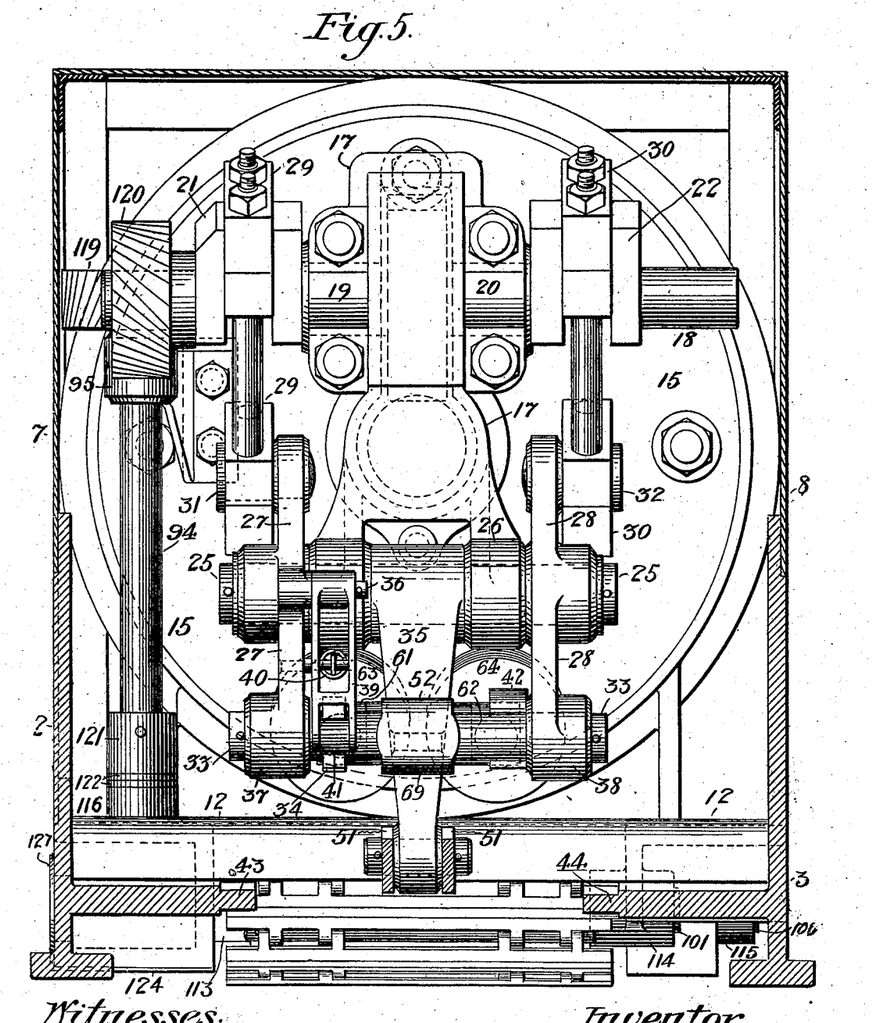
Fig. 5 is a sectional view looking rearward, on lines C—C of Fig. 4, with the slide for cutting knife removed.
Figure 6:
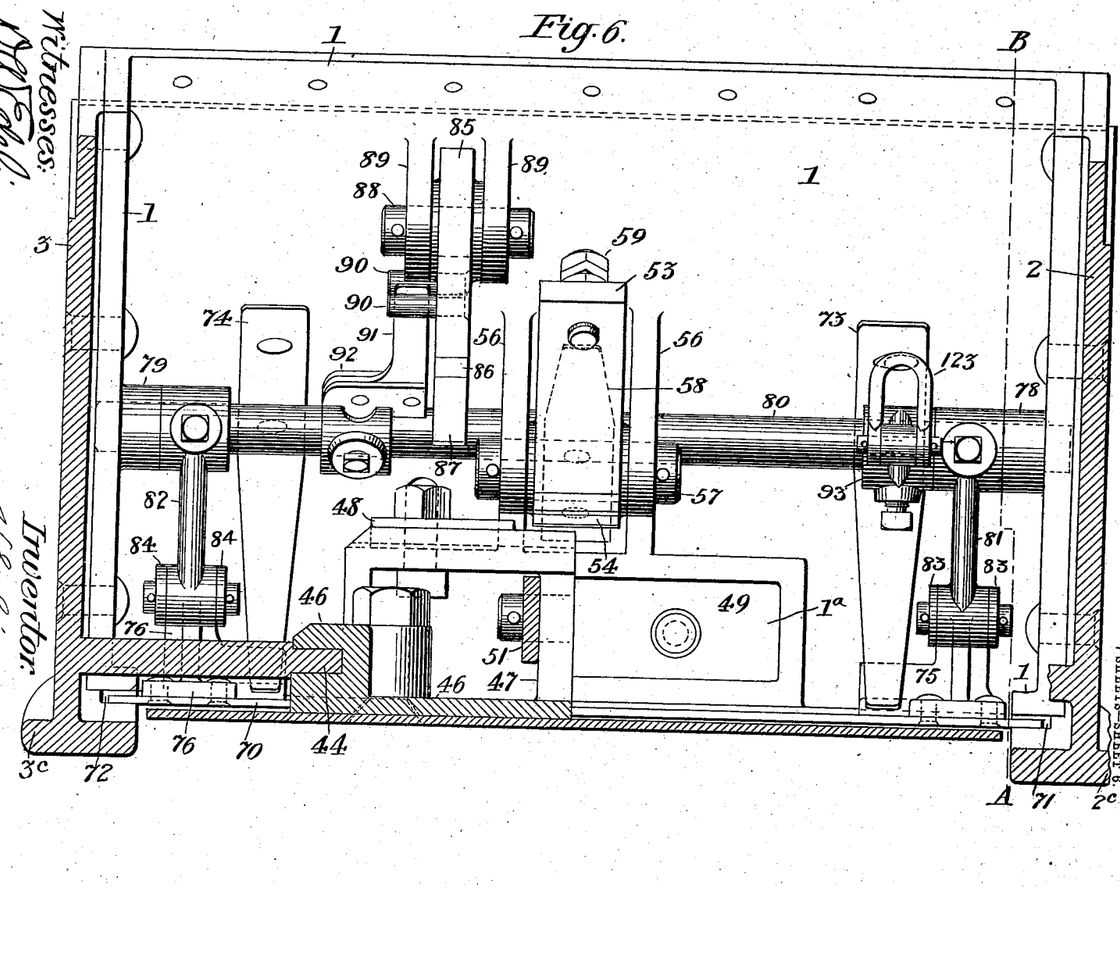
Fig. 6 is a sectional view looking forward, on line E—F of Fig. 3, one-half with the slide for cutting knife removed and its guide broken away.
Figures 7, 8:
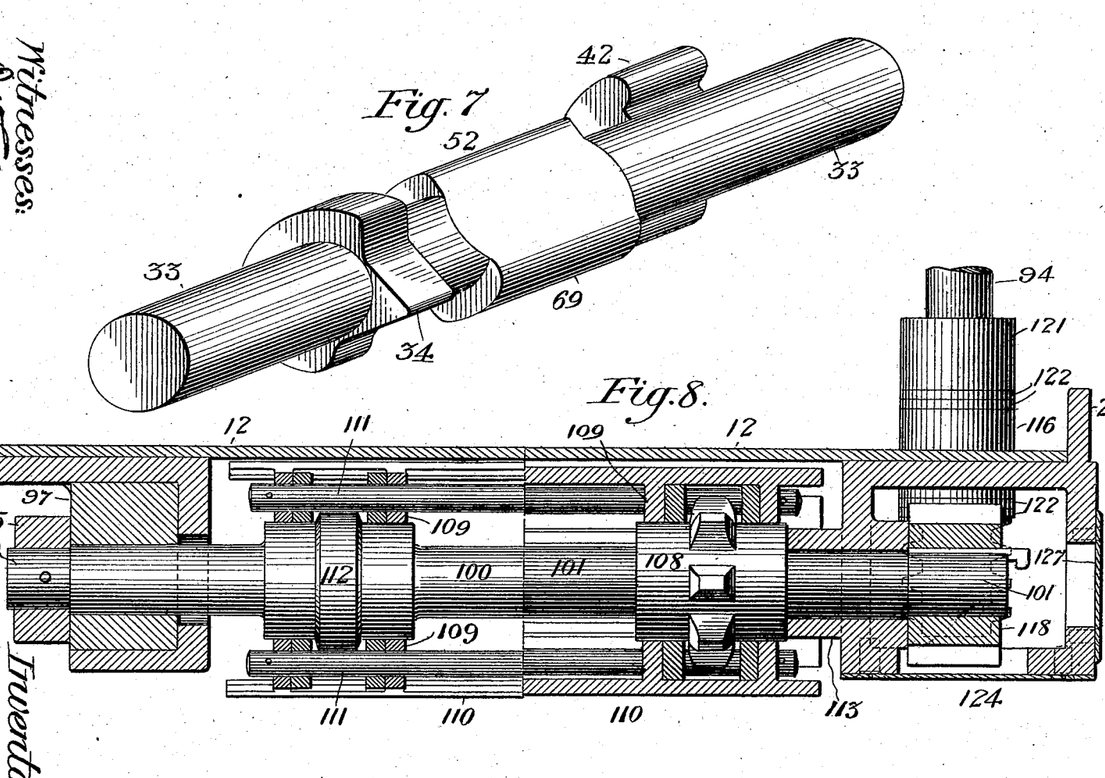
Fig. 7 is an isometric view of the cam-bar.
Fig. 8 is a sectional detail of the propelling apron, one-half on line G—H and one-half on line J—K of Fig. 2.

A trip-plate 70 is adapted to slide in the grooves 71 and 72 formed at the junction of the bottom of the casting 1 with the side-castings 2 and 3 respectively, Fig. 6. Its outer edge normally projects slightly forward beyond the lip 50 of the casting 1, best shown in Figs. 1 and 4, and is pushed into this position by means of the springs 73 74 acting on the lugs 75 76 respectively attached to the top of the push-plate 70 near its rear corners, best shown in Fig. 6. When in its outer or forward position the corners of the front edge of the trip-plate 70 strike against the projections 2$^a$ 3$^a$ at the forward ends of the grooves 71 72. The shaft 80 is journaled in the bosses 78 79 on each side of the rear of the casting 1, and in the lugs 56 of said casting 1. The cranks 81 82 are attached to this shaft 80 in line with each other and close to the bosses 78 79 respectively. Links 83 84 with suitable pins connect the ends of the cranks 81 82 with the lugs 75 76 respectively. When any portion of the forward edge of the trip-plate 70 meets with resistance, as for example a stalk of cane, as the machine moves forward, the trip-plate 70 slides rearward in the grooves 71 72 squarely and without binding, by reason of the lugs 75 76 attached to said push-plate 70 being connected respectively by the links 83 84 to the cranks 81 82 secured to the shaft 80 in line with each other. The rearward motion of the push-plate 70 is limited by the lip 50 encountering the resistance which moved the push-plate 70.

The forked-lever 85 is mounted between the lugs 89 89 on the rear of the casting 1, on the pin 88, and is capable of being tilted in a vertical plane by the turning of the shaft 80. The tilting of the lever 85 is preferably accomplished by means of a flat spring 91 attached to the shaft 80 at one end by means of the clamp 92, and its other end passing between two pins 90 90 projecting from the piece 85. The tilting of the forked-lever 85 is limited, however, by its forward ends striking against the casting 1. The prongs 86 87 of the forked-lever 85 are made wide enough apart to admit the projection 42 on the cam-shaft 33, when swung into the crotch of said forked-lever 85 by the motion of the rocker-arms 27 28, when the forked-lever 85 is in an intermediate or midway position. When, however, the forked-lever 85 is tilted into its upper position, its lower prong 87 engages the lower end of the projection 42, as the cam-bar 33 enters the crotch of the forked-lever 85, thereby causing the cam-bar 33 to turn in its bearings in the bosses 37 38 of the rocker-arms 27 28 respectively. In thus turning the cam-shaft 33, the cam 34 forces forward the lever 39, swinging on the pin 36 against the action of the spring 40, and causes the roller 41 to roll over the point of the cam 34, whereupon the spring 40 pulling on the lever 39 causes the roller 41 to push on the top side of the cam 34 thereby turning the cam-shaft 33 to the position shown in Fig. 4 and to then hold the cam-shaft 33 in this position. By tilting the forked-lever 85 to its lower position its upper prong 86 engages the upper end of the projection 42, whereupon the operation as above described is reversed and the cam-shaft 33 is turned to and held in the position shown in Fig. 3. It will be therefore noted that the cam-shaft 33 is normally held in either one or the other of these two positions by the roller 41 either above or below the cam 34. When in the latter position (Fig. 3) the cam 52 of the cam-shaft 33, engages and pushes the lever 35 as the rocker-arms 27 28 carrying the cam-shaft 33 swing it rearward; and the lever 35 in turn, swinging on the pin 25, compresses the springs 67 68 and at the same time draws rearward the piece 46 sliding on the guides 43 44. When the rocker-arms 27 28 start on their return motion, the piece 48 encounters the toe 54 of the catch-piece 53 thereby preventing further forward travel on the piece 46 and its attached knife 45. The rocker-arms 27 28 continuing forward on their return motion, the cam 69 of the cam-shaft 33 engages the end of the screw 59 in the piece 53 thereby lifting and releasing the toe 54 of the latch 53 from the plate 48, whereupon the springs 67 68 force the lever 35 rapidly forward pushing with it the block 46 and its attached knife 45. As long as the forked-lever 85 remains in its lower position, this operation is repeated at each revolution of the shaft 18. When the forked-lever 85, however, is tilted into its upper position, Fig. 4, the cam-shaft 33 is turned as above described, so that the cam 69 does not engage the screw 59 and therefore the toe 54 continues to hold the cutting mechanism in its rearward position, and the cam 52 likewise does not engage the lever 35. When the forked-lever 85 is in its upper position, the rocker-arms 27 28 continue to oscillate without the cam-shaft 33 coming in contact with either the lever 35 or with the screw 59. A space is shown, Fig. 3, between the cam 52 of the cam-shaft 33 and the lever 35, when the piece 46 is against the bumper 49. This space is to allow for the compression of the bumper 49 when it receives the impact of the block 46 and to prevent the lever 35 from hitting the cam 52.

While it is intended that the cutting mechanism shall be started and stopped automatically by the action of the trip-plate 70 encountering cane, it is also intended to be either started or stopped at the will of the operator. For this purpose a lever 93 is secured to the shaft 80 which may be turned thereby by means of cords attached to a shackle 123 in the end of said lever 93.

The cutting-edge of the knife 45 when in its rear position is back of and under the lip 50 of the casting 1, so that when the block 46 is released an accelerated motion is imparted to the knife before its cutting-edge comes in contact with any cane. The shape of the cutting-edge of the knife 45 I prefer to make as shown in Fig. 1, in order to produce a shearing effect, but any other desired shape may be employed. The lip 50 of the casting 1 and the front edge of the trip-plate 70 are each shaped to correspond with that of the knife 45.

In the rear ends of the side-castings 2 3 are the pockets 102 103 for the blocks 96 97 in which the shaft 100 is journaled. The bolts 98 99 are screwed into the blocks 96 97 through holes in the rear ends of the pockets 102 103 respectively. Over each of the bolts 98 99, between the nuts on their rear ends and the outside ends of the pockets 102 103, is a sleeve 104, a spiral spring 105 and a cup shaped cover 106. On the shaft 100 between the side-castings 2 and 3 are the pulleys 112. The collars 115 on the ends of the shaft 100 keep the blocks 96 97 in the pockets 102 103 and the shaft 100 in place. The shaft 101 is journaled in the bosses 113 114 of the side-castings 2 3, and is provided with two or more sprockets 108. An endless apron is formed by links 109, attached to or a part of the slats 110, connected together by the pins 111. This apron passes around the pulleys 112 on the shaft 100, and its links 109 fit over the sprockets 108 on the shaft 101. Any slack in this apron is taken up by the expansion of the springs 105, the blocks 96 97 sliding in the pockets 102 103 respectively, and by adjustment of the nuts of the bolts 98 99. Most of the weight of the machine is supported upon the apron thus formed, and to prevent any undue rising of the lower portion of the apron, when properly adjusted by the nuts of the bolts 98 99, I limit by the sleeves 104 the forward travel of the blocks 96 97 sliding in the pockets 102 103 and thereby the shaft 100.

The vertical shaft 94 is journaled in the boss 116 of the side-casting 2 and in the bracket 95 attached to the head 15. This shaft 94 is provided with a worm 117 at its lower end, meshing with the worm-gear 118 keyed on the end of the shaft 101, and at its upper end above the bracket 95 is keyed the spiral-gear 119 meshing with a similar gear 120 keyed on the end of the shaft 18. The shaft 94 is also provided with a set-collar 121 and thrust-rings 122 122 above and below the boss 116. A cover 124 attached to the side-casting 2 protects the worm 117 and the worm-gear 118 from dirt. A hole in the side-casting 2, covered by the removable cover 127, permits of the keying of the worm-gear 118 to the shaft 101 and the lubrication of this gearing.

Figure 2:
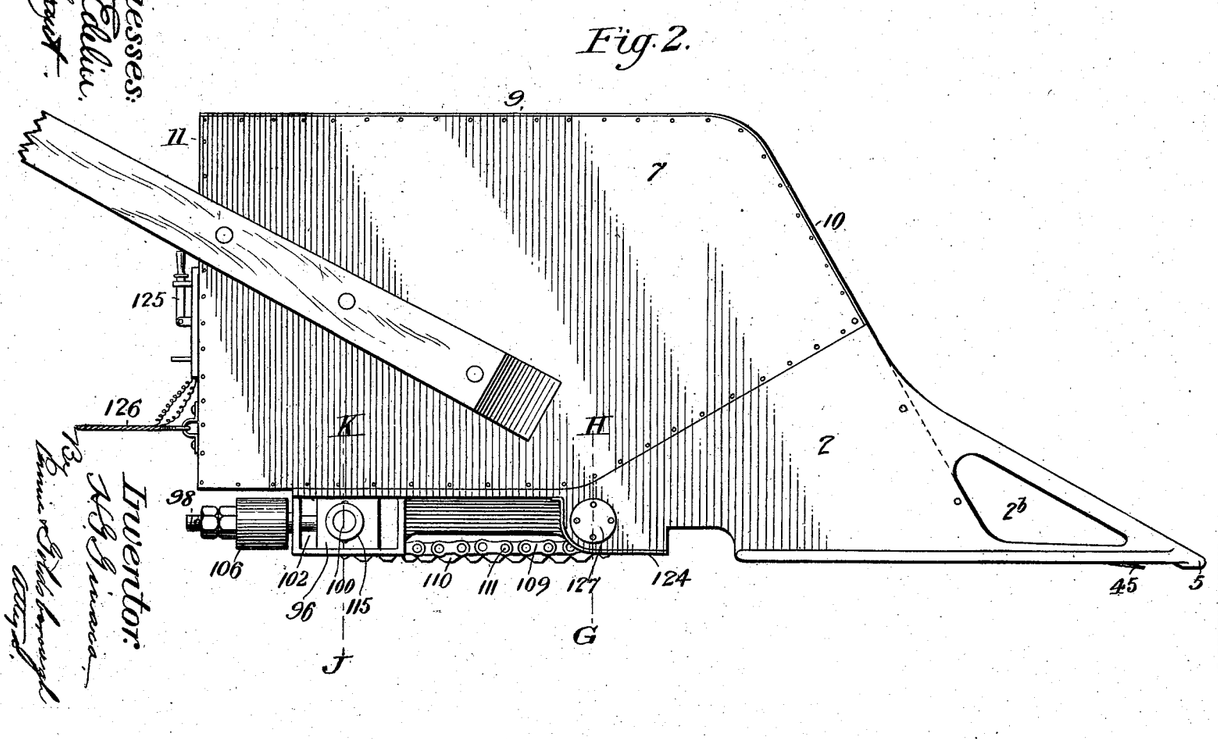
Fig. 2 is a side elevation of the same.

A switch 125 and a controller 128 attached to the end-plate 11, enables the operator to have control of the motor 14, as thereby he can at will start or stop, reverse its direction of rotation, or alter its speed, the current being supplied through the electrically insulated cable 126, attached to the rear of the cover-plate 9 or to the end-plate 11, as shown in Figs. 1 and 2.

Any changes in the construction or arrangement of parts, or of the materials employed, whereby the same results may be obtained, are to be included within the scope of this invention.

The above is a specific description of one form of the invention, while the following claims are definitions of the actual scope thereof.

What I claim, and desire to secure by Letters Patent, is—

1. A cutting apparatus for cane harvesters and the like, comprising a reciprocating knife having a spring-actuated cutting stroke, means for retracting the knife and compressing the spring, a latch for holding the knife in its retracted position, and a trip for releasing the latch and allowing the spring to actuate the knife.

2. A cutting apparatus for cane harvesters and the like, comprising a reciprocating knife having a spring actuated cutting stroke, means for retracting the knife and compressing the spring, a latch for holding the knife in its retracted position, and a trip for releasing the latch and allowing the spring to actuate the knife, the trip being operated by the standing cane.

3. A cutting apparatus for cane harvesters and the like, comprising a reciprocating knife having a spring actuated cutting stroke, means for retracting the knife and compressing the spring, a latch for holding the knife in its retracted position, and a trip for releasing the latch and allowing the spring to actuate the knife, the trip comprising a yielding plate projecting normally in advance of the knife.

4. In a cutting apparatus for cane harvesters and the like, the combination of a forwardly and rearwardly reciprocating knife, a pivoted lever pivotally connected to the knife, a fixed abutment in rear of the lever, and a spring reacting between the lever and the abutment to thrust the knife forward.

5. In a cutting apparatus for cane harvesters and the like, the combination of a reciprocating knife, a spring pressed lever connected thereto, a pair of constantly operating oscillating arms, and a shaft carried by the arms in front of the lever and operating to strike the lever and retract the knife.

6. In a cutting apparatus for cane harvesters and the like, a reciprocating knife, a spring pressed lever connected thereto, a pair of constantly operating oscillating arms, a shaft carried by the arms in front of the lever to strike the lever and retract the knife, and a latch to catch and hold the knife in its retracted position.

7. In a cutting apparatus for cane harvesters and the like, a reciprocating knife, a spring pressed lever connected thereto, a pair of constantly operating oscillating arms, a rock shaft carried by the arms in front of the lever and having a cam to strike the lever and retract the knife, and means for rocking the shaft to place the cam in position either to strike or miss the lever.

8. In a cutting apparatus for cane harvesters and the like, a reciprocating knife, a spring pressed lever connected thereto, a pair of constantly operating oscillating arms, a rock shaft carried by the arms in front of the lever and having a cam to strike the lever and retract the knife, a latch to hold the knife in its retracted position, a cam on the shaft to release the latch, and means to rock the shaft and place the cam in position either to strike the latch or miss it.

9. In a cutting apparatus for cane harvesters and the like, a reciprocating knife, a spring pressed lever connected thereto, a pair of constantly operating oscillating arms, a cam shaft carried by the arms in front of the lever to strike the lever and retract the knife, a latch to hold the knife in its retracted position, means to rock the shaft and place its cam in position to release the latch, and a trip plate to be acted on by the standing cane for operating the shaft rocking means.

10. In a cutting apparatus for cane harvesters and the like, a reciprocating knife, a spring pressed lever connected thereto, a pair of constantly operating oscillating arms, a cam shaft carried by the arms in front of the lever to strike the lever and retract the knife, a latch to hold the knife in its retracted position, a pivoted lever having a forked end toward and from which the oscillating arm swings the cam shaft, a trip plate normally spring-pressed into position to be acted on by the standing cane, and a connection between the trip plate and the forked lever, whereby as the machine advances the standing cane will cause the trip to move the forked lever into position to rock the cam-shaft so as to release the latch, and the spring which presses the trip plate forward will return the forked lever so as to rock the cam-shaft into position to retract the knife operating lever.

In testimony whereof I have signed my name to this specification in the presence of two subscribing witnesses.

HENRY GABRIEL GINACA.

Witnesses:
D. A. Fox,
Robt. J. Pratt.